United States Patent
Lee et al.

(10) Patent No.: US 11,251,679 B2
(45) Date of Patent: Feb. 15, 2022

(54) BRUSHLESS DIRECT CURRENCY (BLDC) MOTOR AND MANUFACTURING METHOD THEREOF

(71) Applicant: COAVIS, Sejong-si (KR)

(72) Inventors: Jung Kil Lee, Sejong-si (KR); Gyu Sang Yu, Sejong-si (KR); Dong Heon Mo, Sejong-si (KR); Hyun Tae Lee, Sejong-si (KR)

(73) Assignee: COAVIS, Yeonseo-myeon (KR)

( * ) Notice: Subject to any disclaimer, the term of this patent is extended or adjusted under 35 U.S.C. 154(b) by 172 days.

(21) Appl. No.: 16/711,979

(22) Filed: Dec. 12, 2019

(65) Prior Publication Data

US 2020/0195088 A1    Jun. 18, 2020

(30) Foreign Application Priority Data

Dec. 13, 2018 (KR) ................ 10-2018-0160582

(51) Int. Cl.
*H02K 7/04* (2006.01)
*H02K 1/27* (2006.01)
*H02K 15/16* (2006.01)
*H02K 21/16* (2006.01)
*H02K 15/03* (2006.01)
*H02K 7/14* (2006.01)

(52) U.S. Cl.
CPC ............. *H02K 7/04* (2013.01); *H02K 1/276* (2013.01); *H02K 7/14* (2013.01); *H02K 15/03* (2013.01); *H02K 15/165* (2013.01); *H02K 21/16* (2013.01)

(58) Field of Classification Search
CPC ........ H02K 7/04; H02K 1/276; H02K 15/165; H02K 21/16; H02K 15/03; H02K 7/14; H02K 7/003; H02K 29/00
USPC ........................................ 310/156.01, 156.12
See application file for complete search history.

(56) References Cited

U.S. PATENT DOCUMENTS

| | | | | |
|---|---|---|---|---|
| 9,653,953 | B2* | 5/2017 | Tanaka | H02K 1/2746 |
| 9,954,415 | B2* | 4/2018 | Hidaka | H02K 1/2733 |
| 10,770,947 | B2* | 9/2020 | Lee | H02K 5/15 |
| 2014/0152138 | A1* | 6/2014 | Tanaka | H02K 9/06 |
| | | | | 310/156.28 |
| 2016/0211719 | A1* | 7/2016 | Hidaka | H02K 1/02 |
| 2020/0021173 | A1* | 1/2020 | Kebukawa | H02K 7/04 |
| 2020/0195088 | A1* | 6/2020 | Lee | H02K 15/03 |

FOREIGN PATENT DOCUMENTS

KR          101232778 B1    2/2013

* cited by examiner

*Primary Examiner* — John K Kim
(74) *Attorney, Agent, or Firm* — Nixon Peabody LLP; Thomas P. Pavelko

(57) ABSTRACT

Provided is a brushless direct currency (BLDC) motor and a manufacturing method thereof, and more particularly, a brushless direct currency (BLDC) motor including a rotor rotated to drive an impeller and capable of reducing a defective rate of the motor due to a rotational imbalance by controlling a shape of a magnet portion included in the rotor, and a manufacturing method thereof.

5 Claims, 8 Drawing Sheets

[FIG. 1]
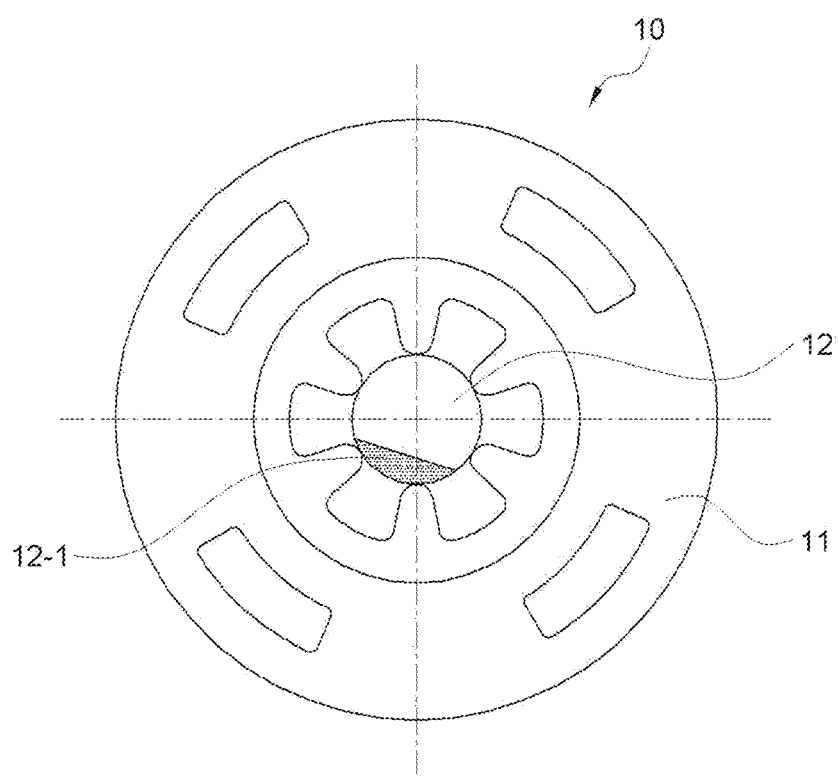

[FIG. 2]
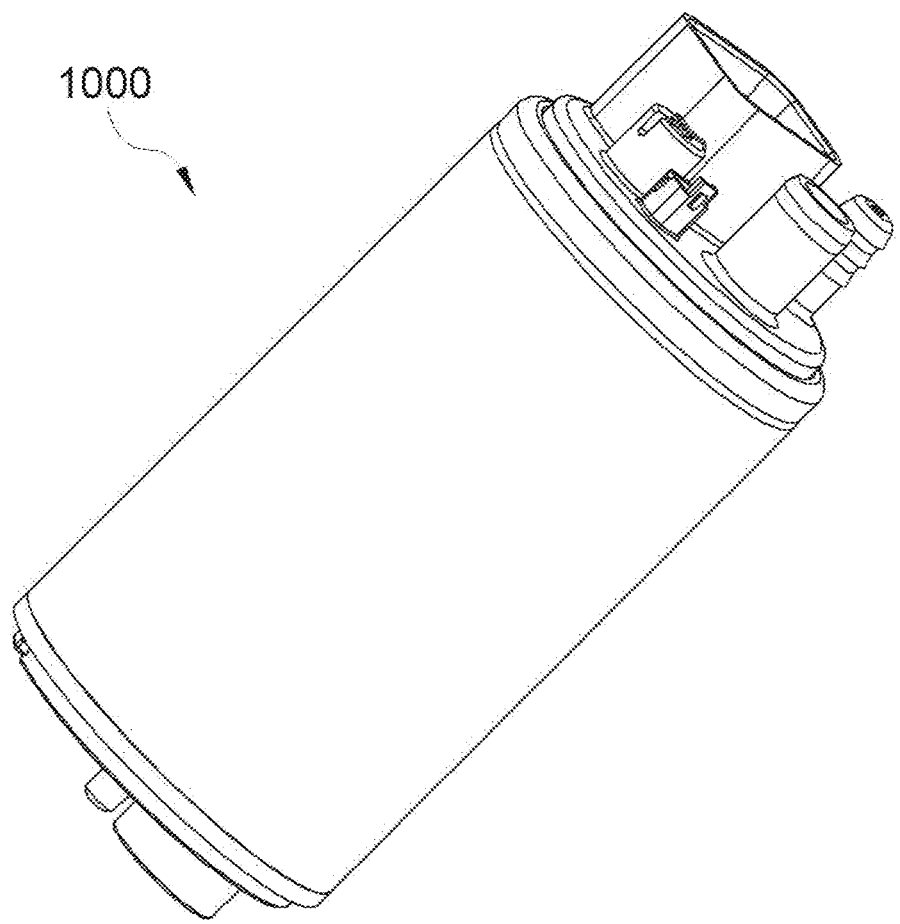

[FIG. 3]
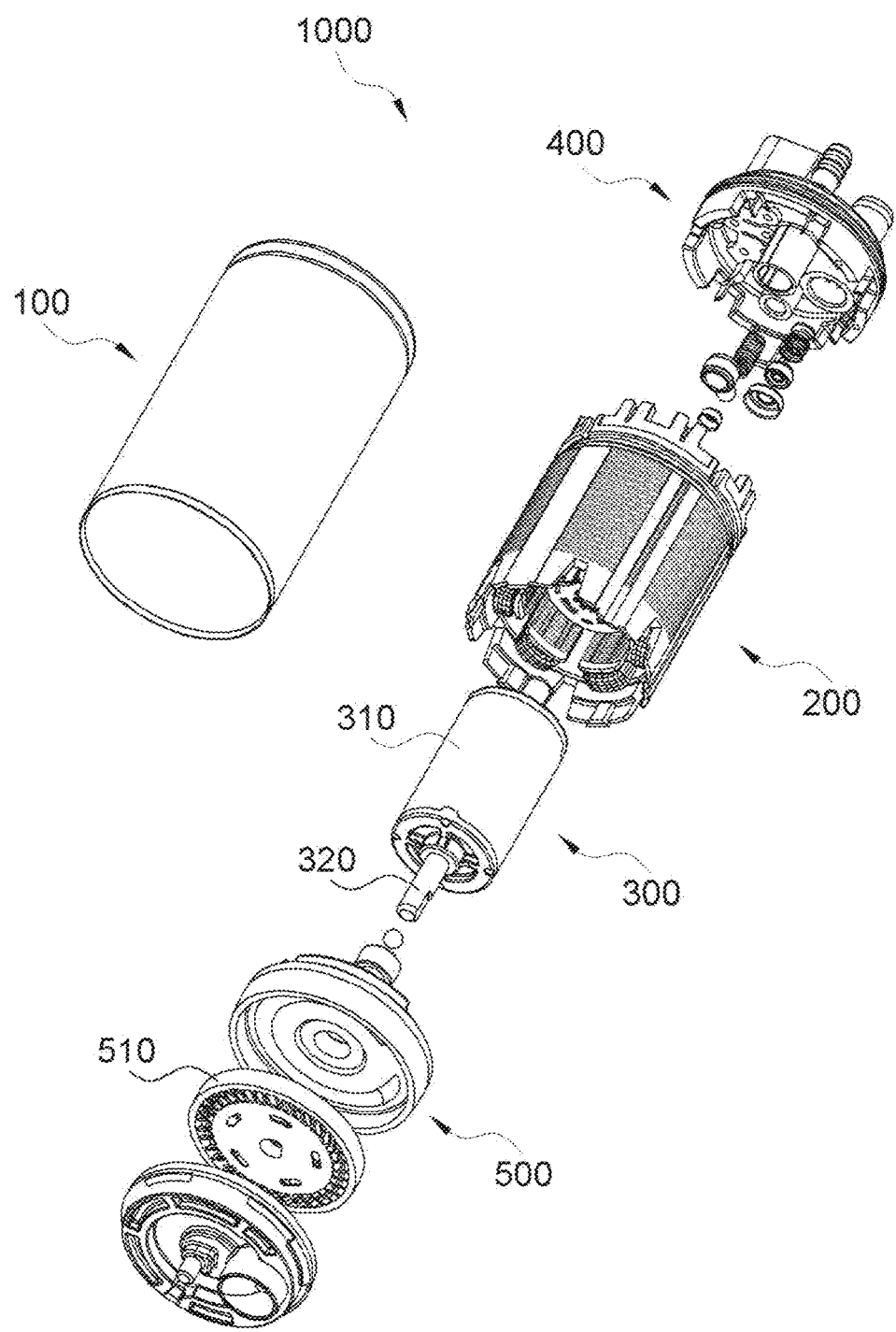

[FIG. 4]
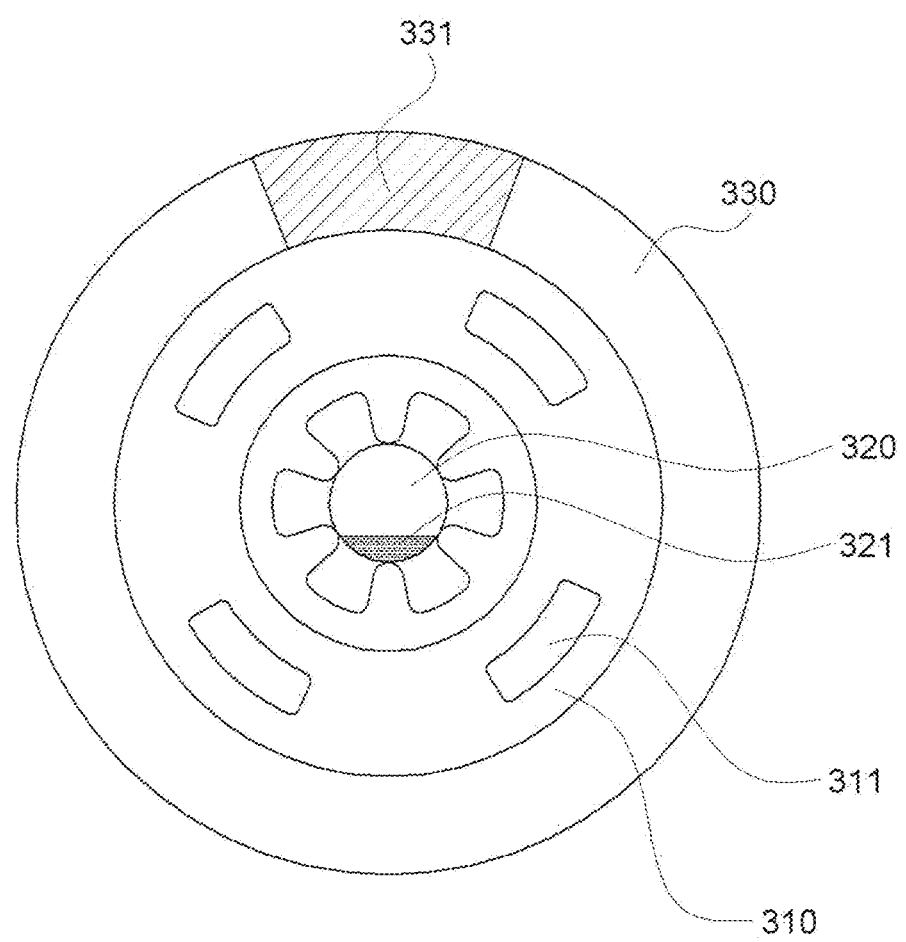

[FIG. 5a]
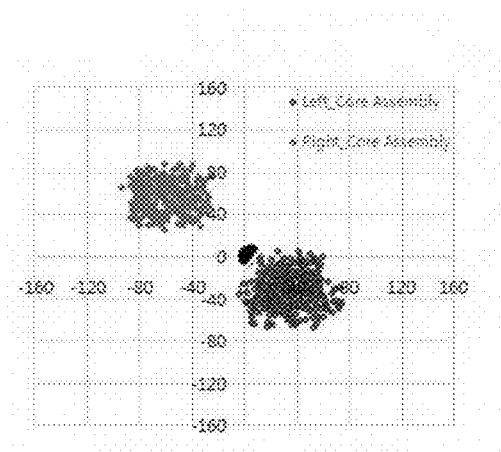
[FIG. 5b]
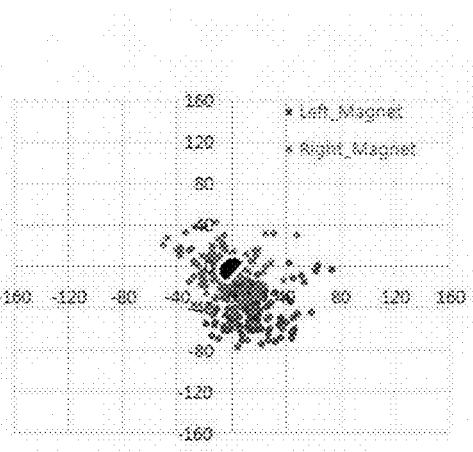

[FIG. 6]
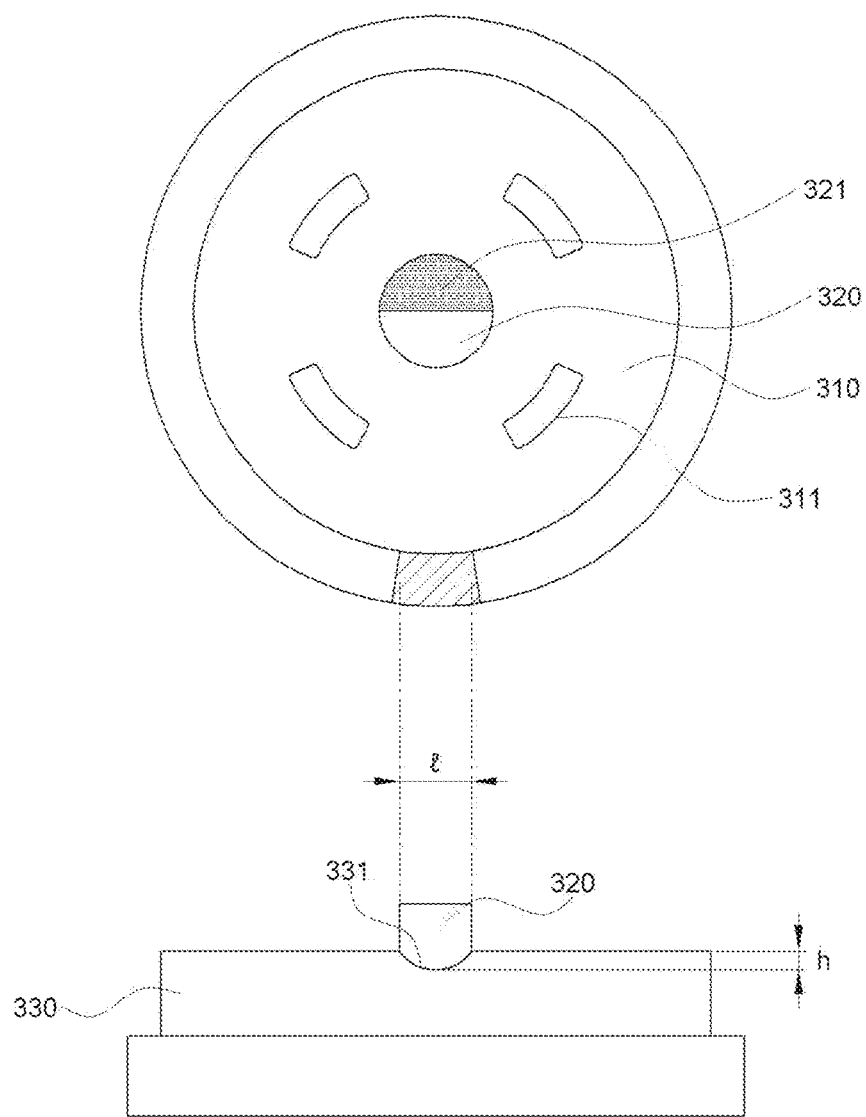

[FIG. 7]
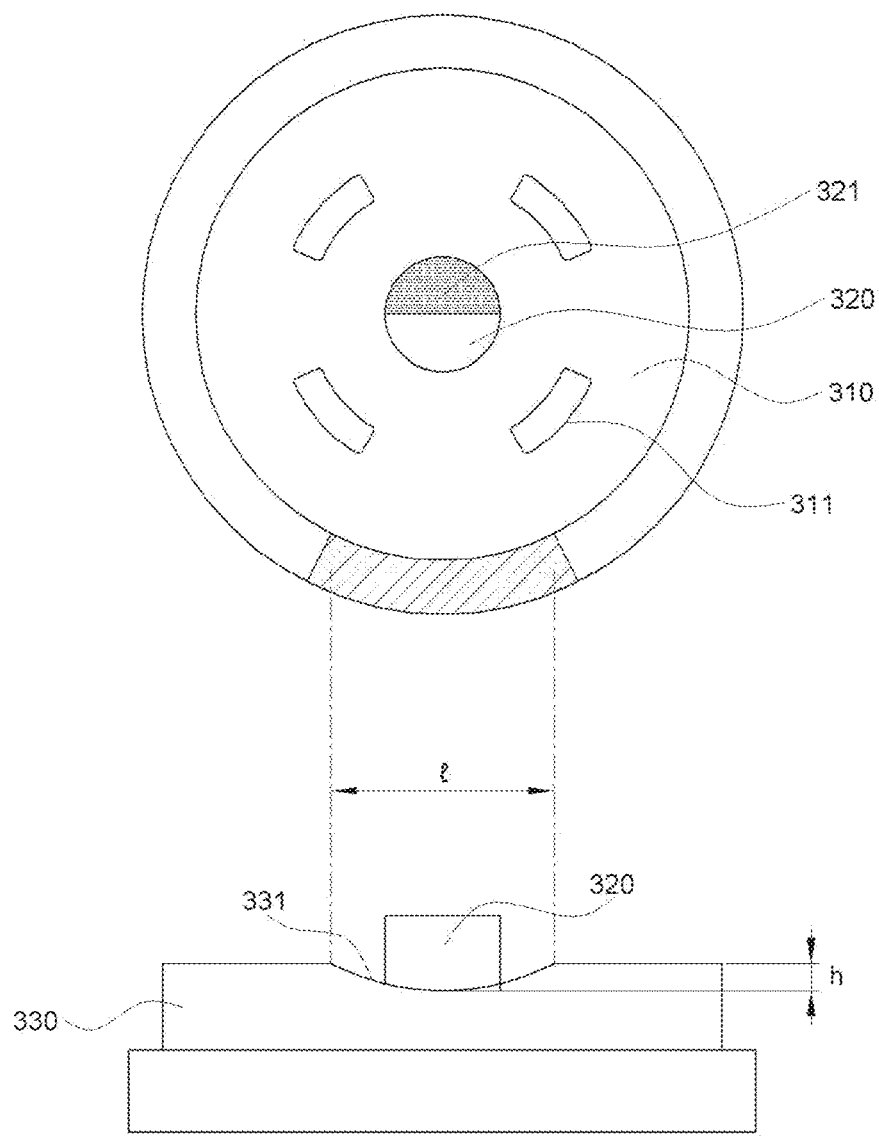

[FIG. 8]

|  | WITHOUT BALANCE PORTION | | WITH BALANCE PORTION | | REDUCTION AMOUNT | |
|---|---|---|---|---|---|---|
|  | Left | Right | Left | Right | Left | Right |
| Type 1 | 25 | 63 | 21 | 32 | 4 | 31 |
| Type 2 | 26 | 67 | 21 | 25 | 5 | 42 |

BRUSHLESS DIRECT CURRENCY (BLDC) MOTOR AND MANUFACTURING METHOD THEREOF

CROSS-REFERENCE TO RELATED APPLICATIONS

This application claims priority under 35 U.S.C. § 119 to Korean Patent Application No. 10-2018-0160582, filed on Dec. 13, 2018, in the Korean Intellectual Property Office, the disclosure of which is incorporated herein by reference in its entirety.

TECHNICAL FIELD

The following disclosure relates to a brushless direct current (BLDC) motor and a manufacturing method thereof, and more particularly, to a brushless direct current (BLDC) motor including a rotor rotated to drive an impeller and capable of reducing a defective rate of the motor due to a rotational imbalance by controlling a shape of a magnet portion included in the rotor, and a manufacturing method thereof.

BACKGROUND

A BLDC motor is an abbreviation for a brushless direct current motor, in which a brush and a commutator are removed from the direct currency (DC) motor and replaced by an electronic commutation member.

In general, the BLDC motor may include an outer stator and a rotatable rotor included in the stator, in which a rotor shaft may be press-fitted into the rotor.

In addition, an outer case is coupled to an outer surface of the stator.

The rotor may include a rotor core in which a press-in hole is formed to allow the above described rotor shaft to be forcedly press-fitted thereinto, and a magnet portion may be positioned around the outer surface of the rotor core.

In case that the BLDC motor applies a current to the stator based on the above described configuration, the stator may sequentially have alternating polarities of N and S poles. Therefore, magnetic forces such as attraction and repulsion generated between the stator and the magnet portion of the rotor may act in a tangential direction of the rotor, thereby causing the rotor to rotate.

Here, one end of the rotor shaft may be fixed to a pump outlet, and the other end thereof may be fixed to a lower case including a drive body. Therefore, the drive body (impeller or the like) may be rotated by rotating the rotor shaft, thereby performing an operation allowing a fluid to flow therein.

As illustrated in FIG. 1, a rotor shaft 12 formed in a cylindrical shape may have a cut portion 12-1 and press-fitted into a rotor core 11. The cut portion 12-1 may be formed by partially cutting the rotor shaft 12 in a width direction. By having the cut portion 12-1, the rotor shaft may be formed asymmetrically and may be rotatably coupled to the lower case.

However, due to the cut portion 12-1, a mass imbalance of a rotor 10 may occur in the rotor 10 including the rotor shaft 12 having the cut portion 12-1. Due to this mass imbalance of a rotor 10, the BLDC motor may be biased in one direction when driven, thereby increasing noise and vibration.

CITED REFERENCE

Patent Document

Korean Patent Publication No. 10-1232778 (Feb. 6, 2013)

SUMMARY

An embodiment in the present disclosure is directed to providing a brushless direct current (BLDC) motor including a rotor rotated to drive an impeller and capable of reducing a defective rate due to a rotational imbalance of the motor by controlling a shape of a magnet portion included in the rotor, and a manufacturing method thereof.

In one general aspect, a brushless direct current (BLDC) motor may include: an outer case; a stator inserted into the outer case; a rotor rotatably inserted into the stator; a pump outlet sealing a top end of the outer case; and a lower case sealing a bottom end of the outer case and including a drive body rotated by a rotation of the rotor, in which the rotor includes a rotor core, a rotor shaft and a magnet portion, the rotor core having a press-in hole in a center thereof and a plurality of rotor core holes in a circumferential direction, the rotor shaft press-fitted into the press-in hole of the rotor core and including a cut portion formed by partially cutting an end of the rotor shaft, which is fixed to the lower case, in a width direction and the magnet portion provided in an outer circumference of the rotor core, and in which the cut portion of the rotor shaft is positioned between the rotor core holes and the magnet portion has a balance portion formed in a cut shape and positioned opposite to the cut portion.

In addition, the balance portion may be formed in a cut shape to have the same mass as that of the cut portion.

In addition, the balance portion may be formed in a curved shape having a predetermined curvature.

In another general aspect, a manufacturing method of the BLDC motor as described above may include forming the rotor, in which the forming of the rotor includes: forming the rotor core; press-fitting the rotor shaft to allow the cut portion to be positioned between selected rotor core holes of the rotor core; and forming the magnet portion to have the balance portion positioned opposite to the cut portion.

In addition, the rotor core, the rotor shaft and the magnet portion may be formed by injection molding.

Other features and aspects are apparent from the following detailed description, the drawings and the claims.

BRIEF DESCRIPTION OF THE DRAWINGS

FIG. 1, As illustrated a rotor shaft 12 formed in a cylindrical shape may have a cut portion 12-1 and press-fitted into a rotor core 11.

FIG. 2 is a perspective view of a brushless direct current (BLDC) motor according to an embodiment in the present disclosure.

FIG. 3 is an exploded perspective view of a BLDC motor according to an embodiment in the present disclosure.

FIG. 4 is a plan view of a rotor included in a BLDC motor according to an embodiment in the present disclosure.

FIGS. 5A and 5B are views illustrating an effect of a BLDC motor according to an embodiment in the present disclosure.

FIG. 6 is a cross-sectional view of a balance portion included in a rotor of a BLDC motor according to an embodiment in the present disclosure.

FIG. 7 is another cross-sectional view of a balance portion included in a rotor of a BLDC motor according to an embodiment in the present disclosure.

FIG. 8 is a view illustrating an effect of a shape of a balance portion included in a rotor of a BLDC motor according to an embodiment in the present disclosure.

DETAILED DESCRIPTION OF EMBODIMENTS

Hereinafter, a brushless direct current (BLDC) motor and a manufacturing method thereof according to embodiments in the present disclosure are described in detail with reference to the accompanying drawings.

FIG. 2 is a perspective view of a brushless direct current (BLDC) motor according to an embodiment in the present disclosure; FIG. 3 is an exploded perspective view of a BLDC motor according to an embodiment in the present disclosure; and FIG. 4 is a plan view of a rotor included in a BLDC motor according to an embodiment in the present disclosure.

Referring to FIGS. 2 to 4, a brushless direct current (BLDC) motor 1000 according to an embodiment in the present disclosure may include: an outer case 100, a stator 200, a rotor 300, a pump outlet 400 and a lower case 500.

The outer case 100 may be formed in a cylindrical shape, have a space into which the stator 200 and the rotor 300 are inserted, and have open top and bottom so that the stator 200 and the rotor 300 are inserted into the space.

The stator 200 may be formed in a cylindrical shape and have a space into which the rotor 300 is rotatably inserted in an axial direction.

The stator 200 may include a stator, a coil, a connector and a molding portion, and thus be identical to a stator of a conventional BLDC motor.

The rotor 300 may be configured to be rotatably inserted into the stator 200 in the axial direction by the magnetism of the stator 200.

Here, the rotor 300 may include a rotor core 310, a rotor shaft 320 and a magnet portion 330.

The pump outlet 400 may be coupled to a top end of the outer case 100 to seal the top end of the outer case 100, and may have a terminal and the like to be electrically connected to a connector controlling a rotation operation of the BLDC motor 1000 according to an embodiment in the present disclosure.

The lower case 500 may be coupled to a bottom end of the outer case 100 to seal the bottom end of the outer case 100, and may include a drive body 510 such as an impeller which is rotated by receiving a rotation of the rotor 300 through the other end of the rotor shaft 320.

The following is a more detailed description of the rotor 300 according to an embodiment in the present disclosure.

The rotor shaft 320 of the rotor 300 may have a cut portion 321 formed by partially cutting an end of the rotor shaft 320, which is coupled to the drive body 510, in a width direction.

Due to this shape of the cut portion 321, a cross section of the other end of the rotor shaft 320 may be formed in an asymmetrical shape rather than a circular shape. A rotational force generated by the rotation of the rotor shaft 320 may thus be accurately transmitted to the drive body 510, and the drive body 510 may thus be accurately operated.

Here, when the rotor shaft 320 of the BLDC motor 1000 according to an embodiment in the present disclosure is press-fitted into the rotor core 310, the cut portion 321 of the rotor shaft 320 may be positioned between rotor core holes 311 formed on the rotor core 310. The magnet portion 330 may have a balance portion 331 formed in a cut shape and positioned corresponding and opposite to the cut portion 321.

That is, in a conventional BLDC motor including a rotor shaft having a cut portion, a mass reduction of the rotor may occur due to the cut portion. Accordingly, when the rotor shaft is rotated, noise and vibration may occur due to such a mass imbalance of the rotor.

Whereas, in the rotor 300 of the BLDC motor 1000 according to an embodiment in the present disclosure, the rotor shaft 320 may have the cut portion 321; and the magnet portion 330 may have the balance portion 331 formed in a cut shape and positioned opposite to the cut portion 321. In this manner, the mass imbalance of the rotor due to the cut portion 321 may be compensated for by the balance portion 331, thereby reducing a defective rate of the BLDC motor due to the mass imbalance of the rotor when the rotor shaft 320 is rotated.

FIGS. 5A and 5B are views illustrating an effect of a BLDC motor according to an embodiment in the present disclosure.

FIG. 5A is a view illustrating a mass distribution in the conventional BLDC motor, and FIG. 5B is a view illustrating a mass distribution in the BLDC motor according to an embodiment in the present disclosure.

As illustrated in FIGS. 5A and 5B, the BLDC motor 1000 according to an embodiment in the present disclosure may include the balance portion 331 to compensate for the mass imbalance of the rotor due to the shape of the cut portion 321. In the BLDC motor 100, there is no great difference between left and right values of the magnet portion 330 in a biased distribution of the mass due to the rotation of the rotor 300. Whereas, in the conventional BLDC motor including only the cut portion and not including the balance portion 331, there is great difference between the left and right values of the magnet portion.

That is, compared with the conventional BLDC motor including only the cut portion, the BLDC motor 1000 according to an embodiment in the present disclosure may prevent the mass imbalance of the rotor due to the cut portion 321 by including the balance portion 331 formed in the magnet portion 330, and may thus prevent an increase in vibration and noise due to the mass imbalance of the rotor.

FIG. 6 is a cross-sectional view of a balance portion included in a rotor of a BLDC motor according to an embodiment in the present disclosure; FIG. 7 is another cross-sectional view of a balance portion included in a rotor of a BLDC motor according to an embodiment in the present disclosure; and FIG. 8 is a view illustrating an effect of a shape of a balance portion included in a rotor of a BLDC motor according to an embodiment in the present disclosure.

As illustrated in FIGS. 6 and 7, the balance portion 331 of the BLDC motor 1000 according to an embodiment in the present disclosure may be formed in a cut shape to prevent deterioration of operation and strength of the magnet portion 330, and may be cut to a height (h) of 0.5 mm to 1.5 mm. The balance portion 331 may be cut to a height of 1 mm, and thereby prevent the mass imbalance of the rotor due to the cut portion 321.

In addition, the balance portion 331 may be cut to a length of 6 mm to 12 mm as a length (l) in a circumferential direction.

When cut to the height of 1 mm as illustrated in FIG. 8, the balance portion 331 may be cut to a length of 10 mm in the circumferential direction.

However, the height (h) and the length (l) of the balance portion 331 described above may depend on the mass reduction of the rotor due to the cut portion 321. Various embodiments may be implemented based on size and shape of the BLDC motor or a shape of the rotor core 310. Therefore, the present disclosure is not limited thereto.

In addition, the balance portion 331 of the BLDC motor 1000 according to an embodiment in the present disclosure may be formed in a curved shape having a predetermined curvature.

That is, the balance portion 331 may be formed in the magnet portion 330 and have a cut shape to correspond to the cut portion 321. However, a crack may occur in the magnet portion 330 as strength of the magnet portion 330 is decreased due to the balance portion 331.

The balance portion 331 of the BLDC motor 1000 according to an embodiment in the present disclosure may have a curved shape having a predetermined curvature. Therefore, the magnet portion 330 may have an increased strength compared to a case of including the balance portion formed in a straight line.

A manufacturing method of a brushless direct current (BLDC) motor according to an embodiment in the disclosure may include forming a rotor 300, in which the forming of the rotor includes forming a rotor core, press-fitting a rotor shaft, and forming a magnet portion.

First, the same methods may be used to manufacture the outer case 100, the stator 200, the pump outlet 400 and the lower case 500 included in the BLDC motor 1000 according to an embodiment in the present disclosure as those used to manufacture the conventional BLDC motor. Therefore, detailed descriptions thereof are omitted.

The forming of the rotor core in the forming of the rotor may be forming the rotor core 310 including the above described rotor core holes 311. Here, the rotor core 310 in the forming of the rotor core may be formed by injection molding.

Here, the rotor core 310 formed by injection molding in the forming of the rotor core may have the same shape as the rotor core included in the conventional BLDC motor. However, embodiments of various shapes, for example, some different shapes may be implemented based on the size and shape of the BLDC motor according to an embodiment in the present disclosure.

The press-fitting of the rotor shaft may be press-fitting and positioning the rotor shaft 320 in the rotor core 310. Here, the press-fitting of the rotor shaft may be press-fitting the rotor shaft 320 to allow the cut portion 321 to be positioned between selected rotor core holes 311 of the rotor core 310.

In the press-fitting of the rotor shaft, the rotor shaft 320 press-fitted into the rotor core 310 may be formed by injection to form the cut portion 321.

Here, in the press-fitting of the rotor shaft, a rotation of the rotor core 310 may be stopped by a positioning pin selected during rotating the rotor core 310. When press-fitted into the rotor core 310, the rotor shaft 320 may be aligned and press-fitted into the rotor core 310 through a position control means using a sensor or the like to allow the cut portion 321 to be positioned between the selected rotor core holes 311 of the rotor core 310.

The forming of the magnet portion may be forming the magnet portion 330. Here, the magnet portion 330 in the forming of the magnet portion may be formed to have the balance portion 331 positioned opposite to the cut portion 321.

Here, like the rotor core 310 and the rotor shaft 320, which are described above, the magnet portion 330 in the forming of the magnet portion may be formed by injection to have the balance portion 331 positioned opposite to the cut portion 321 to keep a mass balance therebetween.

In the forming of the rotor according to the above described manufacturing method (S1000) of the BLDC motor, the rotor shaft 320 may be press-fitted into the rotor core 310 to allow the cut portion 321 to be positioned between the rotor core holes 311; and in the forming of the magnet portion, the magnet portion 330 may be formed to have the balance portion 331 positioned opposite to the cut portion 321. In this manner, it is possible to resolve a mass imbalance of the rotor due to the cut portion 321, thereby reducing a defective rate of the BLDC motor due to a rotation operation of the motor.

According to the present disclosure, in the BLDC motor and the manufacturing method thereof, the BLDC motor may be formed to include the balance portion by controlling a shape of the magnet portion included in the rotor. In this manner, it is possible to reduce a defective rate of the BLDC motor due to the rotational imbalance.

In addition, according to the present disclosure, the BLDC motor and the manufacturing method thereof may prevent the rotational imbalance of the motor by controlling the shape of the magnet portion, and may thus reduce noise and vibration occurring due to the rotational imbalance of the motor.

In addition, according to the present disclosure, the BLDC motor and the manufacturing method thereof may prevent the rotational imbalance of the motor by controlling the shape of the magnet portion included in the rotor, require no additional separate method to prevent the rotational imbalance of the motor, and prevent an increase in manufacturing cost to reduce the noise and vibration of the motor.

The present disclosure is not limited to the above-mentioned embodiments, and may be variously applied. In addition, the present disclosure may be variously modified by those skilled in the art to which the present disclosure pertains without departing from the gist of the disclosure claimed in the claims.

What is claimed is:

1. A brushless direct current (BLDC) motor comprising:
    an outer case;
    a stator inserted into the outer case;
    a rotor rotatably inserted into the stator;
    a pump outlet sealing a top end of the outer case; and
    a lower case sealing a bottom end of the outer case and including a drive body rotated by a rotation of the rotor,
    wherein the rotor includes a rotor core, a rotor shaft and a magnet portion,
    the rotor core having a press-in hole in a center thereof and a plurality of rotor core holes in a circumferential direction,
    the rotor shaft press-fitted into the press-in hole of the rotor core and including a cut portion formed by partially cutting an end of the rotor shaft, which is coupled to the drive body, in a width direction and
    the magnet portion provided in an outer circumference of the rotor core, and
    wherein the cut portion of the rotor shaft is positioned between the rotor core holes and the magnet portion has a single balance portion formed in a cut shape and positioned opposite to the cut portion.

2. The BLDC motor of claim 1, wherein the single balance portion is formed in a cut shape to have the same mass as that of the cut portion.

3. The BLDC motor of claim 1, wherein the single balance portion is formed in a curved shape having a predetermined curvature.

4. A manufacturing method of the BLDC motor of claim 1, comprising forming the rotor,
   wherein the forming of the rotor includes:
   forming the rotor core;
   press-fitting the rotor shaft to allow the cut portion to be positioned between selected rotor core holes of the rotor core; and
   forming the magnet portion to have the single balance portion positioned opposite to the cut portion.

5. The manufacturing method of claim 4, wherein the rotor core, the rotor shaft and the magnet portion are formed by injection molding.

* * * * *